United States Patent [19]

Maier et al.

[11] 4,007,285
[45] Feb. 8, 1977

[54] POPCORN CONTAINER AND HANDLE ASSEMBLY

[75] Inventors: Gary W. Maier, Mount Clemens; David H. Jehn, Richmond, both of Mich.

[73] Assignee: Dun-Hot, Inc., Mount Clemens, Mich.

[22] Filed: Sept. 19, 1974

[21] Appl. No.: 507,350

[52] U.S. Cl. .............................. 426/108; 206/515; 206/526; 220/95; 294/27 H; 426/110; 426/111

[51] Int. Cl.² .................. A23F 1/10; A45C 11/00

[58] Field of Search .......... 426/108, 111, 113, 118, 426/119, 110; 294/27 H, 31, 33, 31.2, 31 R, 31 A, 27 R; 220/8, 95; 229/3.5 MF, 52 AM, 52 AW; 206/503, 515, 526

[56] References Cited

UNITED STATES PATENTS

| | | | |
|---|---|---|---|
| 71,336 | 11/1867 | Smith | 294/33 |
| 1,156,138 | 10/1915 | Gates | 294/33 |
| 2,671,731 | 3/1954 | Vogt | 426/108 |
| 2,791,350 | 5/1957 | Mennen | 294/33 X |
| 2,915,176 | 12/1959 | O'Neil | 426/108 |
| 3,082,906 | 3/1963 | Reed | 426/111 X |
| 3,425,845 | 2/1969 | Dunn | 426/111 |
| 3,519,439 | 7/1970 | Dunn | 426/111 |
| 3,873,738 | 3/1975 | Zoeller et al. | 426/111 |

FOREIGN PATENTS OR APPLICATIONS

| | | | |
|---|---|---|---|
| 332,498 | 5/1903 | France | 294/33 |

*Primary Examiner*—Frank W. Lutter
*Assistant Examiner*—N. Greenblum
*Attorney, Agent, or Firm*—Cullen, Settle, Sloman & Cantor

[57] ABSTRACT

The popcorn container and handle assembly includes a popcorn package having an open-top relatively shallow pan which has an annular rim and a detachable utensil gripping the rim of the pan. A transparent expandable plastic cover having substantially the same shallow outline as the pan extends across and into the pan, with the peripheral edge of the cover disposed between portions of the rim. A charge of popcorn kernels and cooking oil is confined between the pan and the cover. The detachable utensil is made from a single piece of solid metal wire of circular cross-section having the opposite ends thereof secured permanently together by welding to form an endless utensil. The utensil comprises a non-circular expandable and contractable loop for engaging the upper and lower surfaces of the rim of the pan and an elongated expandable and contractable handle of generally U-shape configuration extending from the loop. A force applied to the handle changes the configuration of the loop by increasing the size thereof to permit the utensil to be placed on the rim of the pan. When the force is removed the loop, which decreases in size, returns towards its original configuration and firmly grips the rim of the pan. The utensil may be removed from the pan after the popcorn is cooked and thereafter used with other popcorn packages.

2 Claims, 3 Drawing Figures

POPCORN CONTAINER AND HANDLE ASSEMBLY

BACKGROUND OF THE INVENTION

1. Field of the Invention

Disposable popcorn packages of the general type herein disclosed have become increasingly popular in recent years. Such popcorn packages include a disposable shallow pan fabricated of metal foil which serves as a cooking implement for application of heat to pop a charge of popcorn kernels, cooking oil and seasoning. A flexible transparent plastic cover is provided to overlie the charge and seal the charge in the pan during storage of the packages. When the kernels in a package are to be popped, the heat involved in the cooking action causes generation of vapors which, in turn, cause the flexible cover to balloon outwardly thus providing a space to receive the popped corn. Such disposable packages are widely used in public places such as taverns, restaurants and amusement centers as a means for providing fresh popcorn to customers. The packages are also sold in grocery stores for home or family consumption. One of the advantages of the present construction resides in the fact that a number of popcorn packages or pans may be nested together and assembled into a container having one detachable utensil to thus form a compact storage unit for home or family use, with the utensil being detachable after the popcorn in one pan is popped and thereafter used with another pan.

2. Description of the Prior Art

The basic pan or popcorn package construction is generally illustrated in U.S. Pat. No. 3,425,845, issued Feb. 4, 1969 and in U.S. Pat. No. 3,519,439, issued July 7, 1970 which are owned by the assignee of record. A machine for popping the kernels on a commercial scale and including as an element of the machine a piercing element for puncturing an expandable cover of a popcorn package is illustrated in U.S. Pat. No. 3,359,886, issued Dec. 26, 1967 and which is also owned by the assignee of record.

The prior art illustrates pan and handle assemblies in the following U.S. Pat. Nos. 2,791,350, issued May 7, 1957; 2,673,806, issued Mar. 30, 1954; 2,572,694, issued Oct. 23, 1951; 2,547,096, issued Apr. 3, 1951; 2,528,251, issued Oct. 31, 1950; 1,322,864, issued Nov. 25, 1919; 870,839, issued Nov. 12, 1907; and 489,256, issued Jan. 3, 1893. In addition the assignee of record owns U.S. Pat. No. 3,782,976, issued Jan. 1, 1974 which relates to a popcorn package and handle assembly wherein the handle has an integral piercing element to puncture the expandable cover of the pan and thereby permit the vapor to escape during popping of the kernels.

Even though some of the prior art patents noted above illustrate pans or utensils having expandable covers, none of them utilize a one piece reusable and detachable utensil-handle which engages the rim of the pan in the manner disclosed hereinafter.

SUMMARY OF THE INVENTION

The popcorn container and handle assembly comprises a package having an open-top relatively shallow pan fabricated of semi-rigid self-supporting metallic sheet material, with the pan having an annular rim. A cover of flexible sheet material extends across and into the pan and has substantially the same relatively shallow outline as the pan to thereby permit nesting of a plurality of the packages. A charge of popcorn kernels and cooking oil is confined between the pan and cover. With such a construction the cover is outwardly expandable upon heating of the charge. The rim comprises a first generally radially outwardly extending rim portion and a second overlying reversely bent rim portion. The marginal peripheral edge portion of the cover is clamped between the rim portions.

A detachable utensil is provided for the package and is made from a single piece of solid metal wire of circular cross-section having the opposite ends thereof welded permanently together to form an endless or continuous utensil. The utensil comprises a non-circular, expandable and contractable loop for engaging the upper and lower surfaces of the rim of said pan and an elongated expandable and contractable handle of generally U-shape configuration extending from the loop. The loop includes front, rear and intermediate portions engageable with upper and lower surfaces on the rim.

The handle has a pair of arms connected together on the outer ends thereof. The front portions of the loop adjacent the handle are spaced apart to permit the loop to be expanded by applying a force urging the arms of the handle apart and increasing the size of the loop to permit the utensil to be placed on the rim of the pan. The handle extends laterally outwardly from the pan. The rear portion of the loop is engageable with the lower surface of the rim of the pan. The front portions of the loop are spaced from the rear portion and engageable with the lower surface on another portion of the rim. The intermediate portions of the loop are elongated, located between and connects the front and rear portions. With such a construction the intermediate portions are engageable with the upper surface of other portions of the rim. The loop decreases in size and firmly grips the rim of the pan upon the removal of the force applied to the arms of the handle. The detachable handle may be used with any number of popcorn packages.

IN THE DRAWING

DESCRIPTION OF THE PREFERRED EMBODIMENT

Figure 1:
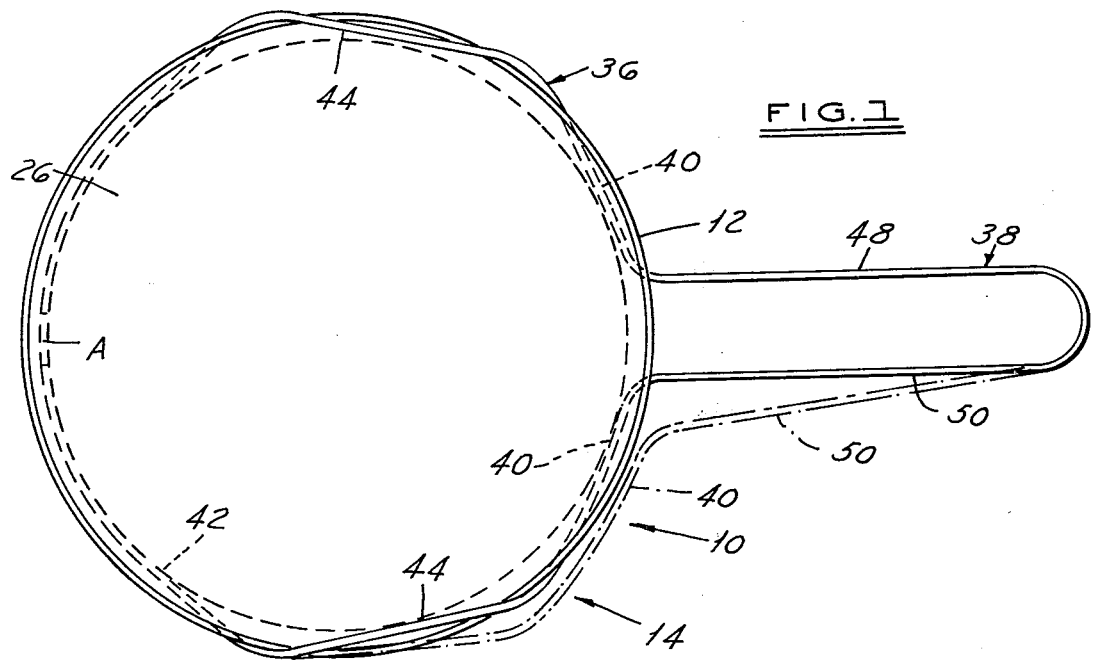
FIG. 1 is a top plan view of the pan and handle assembly, illustrating the detachable utensil in dotted lines and in an expanded state when applying the utensil to the rim of the pan.

The popcorn package or pan and handle assembly 10 comprises an open-topped relatively shallow pan 12 and an attachable wire form utensil 14 secured to the pan 12. The pan 12 has an annular continuous flange or rim 15 which extends around the mouth of the pan 12. The pan 12 is fabricated of a flexible metallic sheet material such as aluminum foil. The gauge of the foil is sufficient so that the pan 12 is sufficiently rigid to be self-supporting and so that the bottom wall 16 will not burn out when subjected to heat for the purpose of popping corn.

Figure 3:
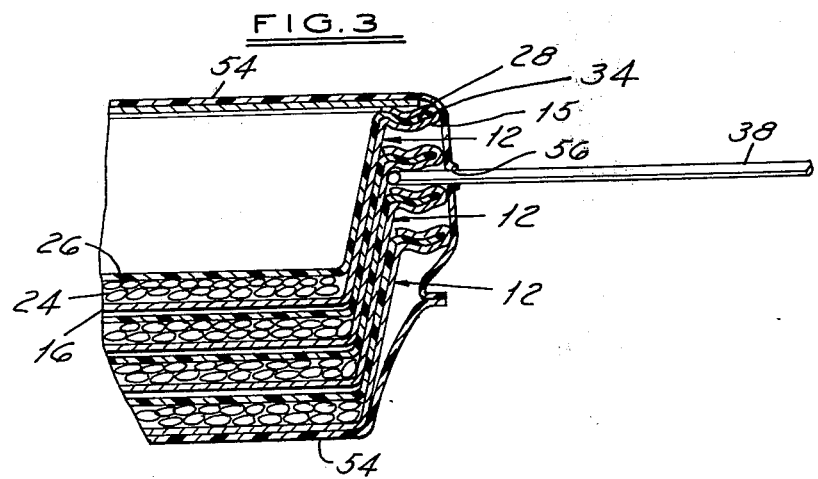
FIG. 3 is a fragmentary sectional view of the popcorn container and handle assembly shown in FIG. 2.

The sidewalls 18 of the pan flare outwardly from the bottom wall 16. The flange of rim 15 extends generally radially outwardly from the side walls 18. The flange 15 comprises a first outwardly bent wall portion and an inturned wall portion which overlies the first portion as shown in FIG. 3. A charge of popcorn kernels 24, preferably a single layer, is provided in the bottom of the pan 12. Hydrogenated vegetable cooking oil and popcorn seasoning complete the charge.

A flexible cover 26 extends across the pan 12 and downwardly into the pan (FIG. 3). The cover 26 has substantially the same relatively shallow outline as the pan 12. The cover 26 is preferably fabricated of a transparent plastic material such as cellophane. The cellophane has sufficient thickness to withstand the relatively high pressure involved in popping the corn.

Figure 2:
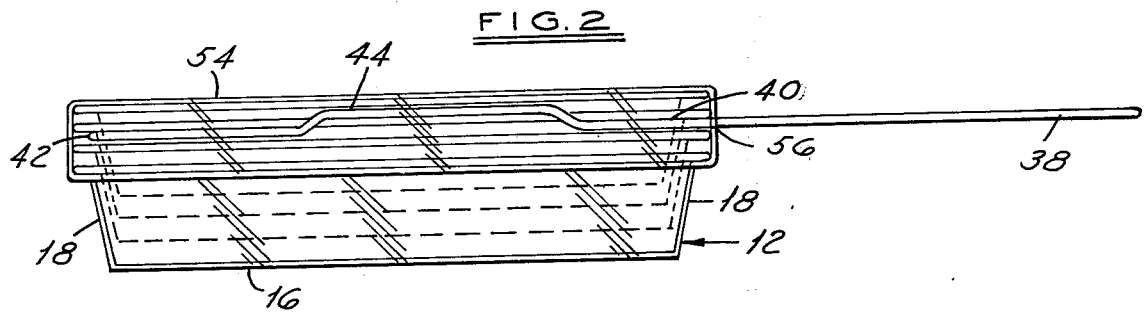
FIG. 2 is an elevational view of a popcorn container and handle assembly utilizing one utensil and a plurality of popcorn packages.

As will be noted in FIG. 2, the marginal peripheral portion 28 of the cover 26 is received between the wall portions of the annular continuous flange 15. The portion 28 may comprise reversely bent edge portions to form two layers for added strength. The marginal edge 28 of the cover 26 extends all of the way into the flange or rim 15 and terminates at the bend 34 of the flange 15. The marginal edge 28 of the cellophane cover 26 is frictionally held by the crimping action of the flange 15 to provide a sealed package.

The utensil 14 is made from a single piece of relatively strong solid metal wire such as steel wire of circular cross-section. The opposite ends of the wire are permanently secured together by welding at area A, located opposite the handle 38, to form the utensil 14 which is endless or continuous. The utensil 14 comprises a non-circular, expandable and contractable loop 36 for engaging the upper and lower surfaces of the rim 15 of the pan 12 and an elongated expandable and contractable handle 38 of generally U-shape configuration as shown in FIG. 1. The handle 38 is integral with the loop 36 and together form the utensil 14. The handle 38 extends laterally outwardly from the pan 12 to provide a convenient hand grip for moving the popcorn package 12 across a heating element.

The loop 36 includes a pair of arcuate front portions or segments 40, an arcuate and elongated rear portion or segment 42 and a pair of intermediate portions or segments 44 which are straight as noted in FIG. 1. The front and rear portions 40 and 42 engage the lower surface of rim 15 while the pair of intermediate portions 44 engage the upper surface of rim 15 as shown in FIG. 1. The handle 38 includes a pair of arms 48, 50 which are integral with the front loop portions 40. The utensil 14 due to its endless and welded construction is rigid and sturdy.

The front portions 40 of the loop 36 adjacent the handle 38 are spaced apart to permit the loop 36 to be expanded by applying a force urging the arms 48, 50 apart thereby increasing the size of the loop 36 to permit the loop 36 of the utensil 14 to be placed on the rim 15 of the pan 12, with the front and rear portions 40, 42 being engageable with the lower surface of the rim 15 and the intermediate straight portions 44 of the loop 36 being elongated and engageable with the upper surface of other portions of the rim 15 as shown in FIG. 1. Once the loop 36 is on the rim 15 of pan 12, the force is removed from the arms 48, 50 of the handle 38 whereby the loop 36 decreases in size and firmly grips the rim 15 of the pan 12.

In use, heat is applied to the bottom wall 16 of popcorn package 12. This heat initially causes the oil to boil with a portion thereof vaporizing. The pressure created by the evaporation of the oil causes the cover 26 to balloon upwardly as noted in U.S. Pat. No. 3,782,976 aforesaid. This upward ballooning provides space for popping of the corn.

Excess pressure is relieved by puncturing a small hole in the plastic cover 26 prior to popping. Although the flange of rim 15 is crimped over the marginal edge 28 of the cover 26, the crimping pressure is not always sufficient to result in a fluid-tight seal at the relatively high pressures encountered during popping of the corn. Consequently, the excess pressure is relieved by escape of gas through the hole manually placed in cover 26 as is well known in the art.

During the popping action, the cover 26 will not come loose from the flange 15 because of the positive holding action provided by the flange 15. Tearing of the cover material is prevented by the amount of material of the cover 26 clamped into the outwardly extending rim 15.

After the cover 26 starts to balloon upwardly, the corn begins to pop. The popping action is continued until all of the corn is popped. The amount of the charge placed in the package 10 is sufficient to completely fill the package with the popped corn being somewhat compacted. After the kernels have been popped, the package is removed from the heat source. The cover 26 may be perforated by means of a sharp instrument such as a knife and torn away to permit eating of the corn. After use the entire package is discarded.

The popcorn container and handle assembly may contain any number of popcorn packages 12 and one utensil 14. As noted in FIGS. 2 and 3, four popcorn packages are indicated with the packages being nested together and generally of a low silhouette. As indicated in FIGS. 2 and 3 the utensil 14 is detachably secured to an intermediate popcorn package 12, with several other packages 12 being nested on opposite sides thereof as indicated. A removable plastic cover or envelope 54 made, as an example, from cellophane, is wrapped tightly around the nested popcorn packages 12 and utensil 14, with the handle extending outwardly through a small slot or opening 56 provided in the envelope 54.

The container or assembly illustrated in FIG. 2 is sold containing four popcorn packages 12 and one utensil 14. In use, the plastic envelope 54 is removed. Once the popcorn package 12 having the handle 38 affixed thereto is popped, the handle is removed and is then slipped under and over the rim 15 of another pan or package 12 as described previously.

What we claim as our invention is:

1. A popcorn container and handle assembly comprising a first popcorn package having an open-top relatively shallow pan fabricated of semi-rigid self-supporting metallic sheet material, said pan having an annular rim, a cover of flexible sheet material extending across and into the pan and having substantially the same relatively shallow outline as the pan, and a charge of popcorn kernels and cooking oil confined between the pan and cover, said cover being outwardly expandable upon heating of the charge, said rim comprising a first generally radially outwardly extending rim portion and a second overlying reversely bent rim portion, the marginal peripheral edge portion of said cover being clamped between said rim portions, and a detachable utensil made from a single piece of solid metal wire of circular cross-section having the opposite ends thereof secured permanently together to form an endless utensil and comprising a non-circular, non-rectangular, expandable contractable loop for engaging the upper and lower surfaces of the rim of said pan and an elongated expandable and contractable handle of generally U-shape configuration extending from said loop, said loop including front, rear and intermediate portions engageable with said rim, said handle extending from said front portions of said loop and having a pair of arms connected together on the outer ends thereof, said front portions of said loop adjacent said handle being spaced apart to permit said loop to be expanded by applying a force urging the arms of said handle apart and increasing the size of said loop to permit the loop of said utensil to be placed on the rim of said pan, with said handle extending laterally outwardly from said pan, said rear portion of said loop being engaged with only the lower surface and not the upper surface of the rim of said pan, said front portions of said loop being spaced from said rear portion and engaged with only the lower surface and not the upper surface on another portion of said rim, and said intermediate portions of said loop being elongated and located between and connecting, said front and rear portions, each of said intermediate portions including a straight elongated central portion having substantially its entire longitudinal extent engaged with only the upper surface and not the lower surface of other portions of said rim, each of said intermediate portions including integral end portions connecting said central portion to said front and rear portions such that the plane of said central portions is spaced from and parallel to the plane of said front and rear portions and said end portions form an angle with said planes, said loop decreasing in size and firmly gripping said engaged portions of the rim of said pan upon the removal of the force applied to the arms of said handle.

2. The popcorn container and handle assembly defined in claim 1, further comprising second and third popcorn packages, with said first popcorn package and said utensil being nested between said second and third packages, and a removable plastic envelope wrapped tightly around said nested packages, with said handle extending outwardly through an opening in said envelope, said utensil being adapted to be used with all of said packages.

* * * * *